United States Patent [19]
Althoff et al.

[11] Patent Number: 5,148,925
[45] Date of Patent: Sep. 22, 1992

[54] WALL MOUNTED RACK

[76] Inventors: Donald J. Althoff, 1946 Minda Dr.; Glen P. Hunt, 1686 Gilham Rd., both of, Eugene, Oreg. 97401

[21] Appl. No.: 767,669

[22] Filed: Sep. 30, 1991

[51] Int. Cl.⁵ .................................. A47F 5/00
[52] U.S. Cl. ........................... 211/41; 211/94
[58] Field of Search .............. 211/41, 40, 87, 88, 211/94

[56] References Cited

U.S. PATENT DOCUMENTS

| | | | |
|---|---|---|---|
| 3,425,568 | 2/1969 | Albright | 211/94 X |
| 4,573,749 | 3/1986 | Massaro | 312/12 |
| 4,584,950 | 4/1986 | Adams et al. | 211/94 X |
| 5,052,564 | 10/1991 | Zuzack | 211/40 |

Primary Examiner—Robert W. Gibson, Jr.
Attorney, Agent, or Firm—James D. Givnan, Jr.

[57] ABSTRACT

The present rack includes rack members for installation on a wall with spacers vertically spacing the members. A shelf on each rack member supports articles which are confined on the shelf by a barrier on the shelf outer extremity. Pairs of spacer receiving sleeves are on each rack member with one sleeve providing a fulcrum surface about which an article may be tilted, subsequent to lifting of the article by fingertip pressure, for removal of the article from the rack.

7 Claims, 1 Drawing Sheet

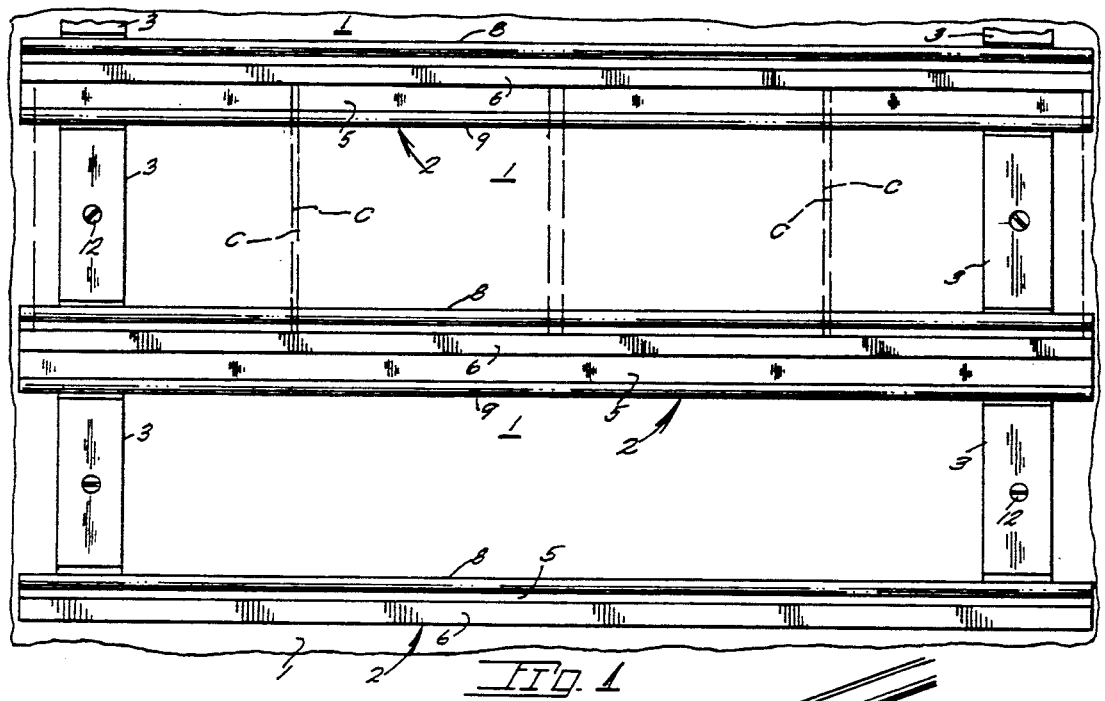
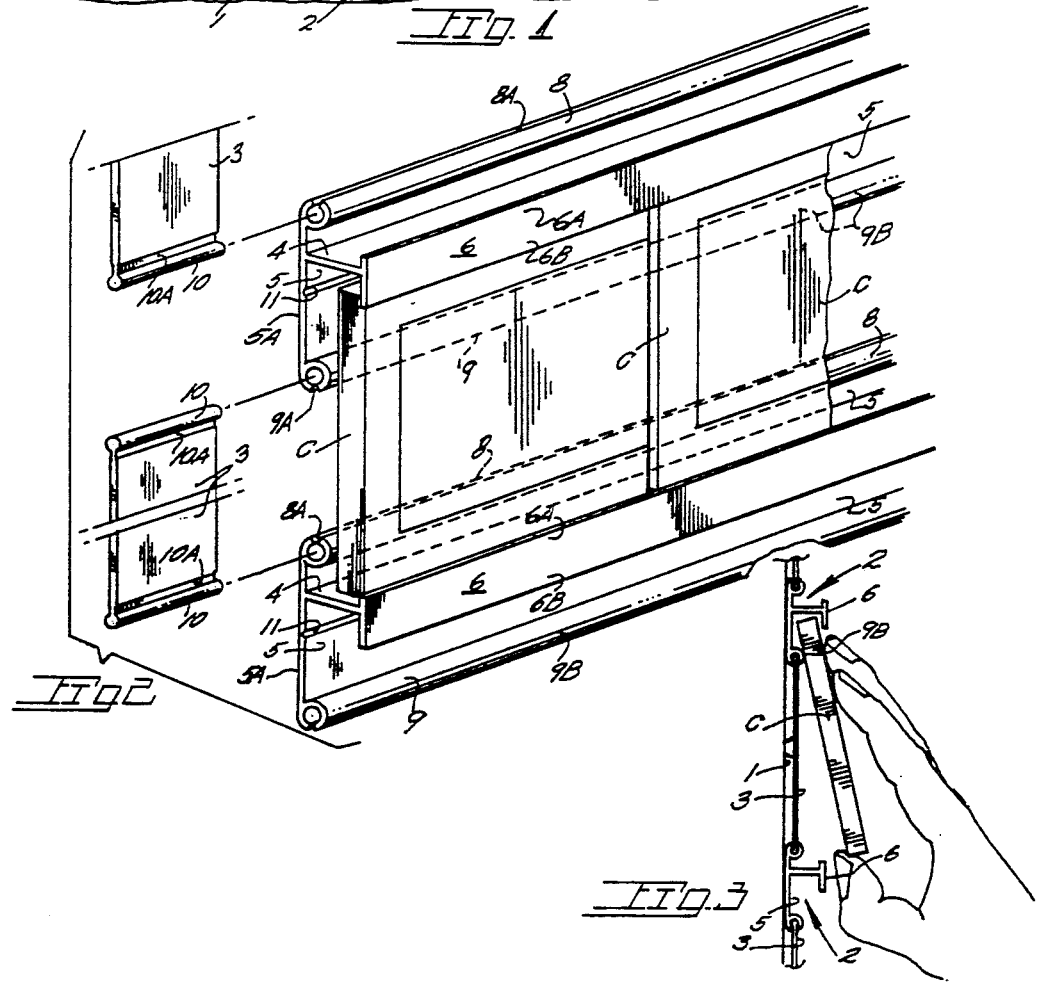

WALL MOUNTED RACK

BACKGROUND OF THE INVENTION

The present invention pertains generally to racks for wall attachment for the storage of articles in a highly accessible manner.

Presently in wide use are compact discs which are packaged in a container of rectangular shape and provided with an illustration. The storage and display of the containers is desirably in a conspicuous manner to enhance sales of the compact discs in stores as well as for the enjoyment of the purchaser who wishes to display a collection of compact disc containers. While display of a container for a compact disc is desirable, it is important that such display be in a compact manner and permit removal of the container without undue effort. Where the rack is to be used in the home it is important that the rack be of low cost construction and easily installed on a wall to hold several disc containers in a manner displaying the front wall surface of the container. Of additional importance is the ease of packaging the rack which renders same easily stored in retail establishments.

U.S. Pat. No. 4,573,749 is of some interest in that it discloses a wall mounted storage rack for containers of various types of recordings. Each rack member has a shelf with cut out areas to facilitate grasping of the container for removal from the rack. Additionally, each rack component is adapted for attachment to a rib formed on a subjacent rack. Such racks do not lend themselves to high volume, low cost production methods.

SUMMARY OF THE PRESENT INVENTION

The present invention is embodied within a rack for wall attachment wherein, for example, compact disc containers may be stored in a displayed manner in a store or residence.

The present rack utilizes rack members which receive a container for a compact disc or other like article. The container is displayed to promote sales or when used in a residence for personal satisfaction. A projection on the rack members serves to support the displayed article during upward and tilting movement of same for removal from or insertion into the rack. Accordingly the container is highly accessible for removal and installation purposes without the necessity of the rack having open areas spaced therealong to permit manipulation of the container. Spacer means interposed between the rack members assure the separation of same in parallel and, further, may be utilized for attachment of the rack to a wall.

Important objectives of the present rack is the provision of a rack for wall attachment on which may be supported a multitude of containers in a highly accessible manner; the provision of a rack which may be produced by low cost, high volume production methods; the provision of a rack which lends itself to compact packaging for convenient storage at a sales outlet; the provision of a rack of a design permitting extrusion of same in a low cost manner; the provision of a rack on which containers for various types of recordings may be stored with the racks including a projection about which the container may be tilted to facilitate removal from the rack; the provision of a rack including barrier means which serves to confine the lower edge of a first container and the upper edge of a container stored on a subjacent rack.

BRIEF DESCRIPTION OF THE DRAWINGS

In the drawings:

FIG. 1 is a front elevational view of the rack;

FIG. 2 is a fragmentary perspective view thereof; and

FIG. 3 is a fragmentary end view thereof showing a partially removed article.

DETAILED DESCRIPTION OF THE PREFERRED EMBODIMENTS

With continuing attention to the drawings wherein applied reference numerals indicate parts similarly hereinafter identified, the reference numeral 1 indicates a room wall surface to which the following described rack is applied.

The present rack includes rack members indicated generally at 2 vertically spaced from one another by spacer components at 3.

With continuing attention to a rack member, the same includes a shelf 4 integral with a wall component 5 of the rack. Shelf 4 extends horizontally from wall component 5 and terminates in a barrier 6 having an upper portion 6A and a lower portion 6B. Shelf 4 supports a box shaped container indicated at C with the upper portion of the barrier serving to confine the lower edge of the container in place on the shelf. The lower portion 6B of said barrier serves to confine the uppermost edge of a subjacent rectangular container C against outward movement. The clearance between the uppermost edge of container C and the underside of shelf 4 is of a magnitude to permit lifting of the container, as later described, to the extent the container's lowermost edge may swing outwardly past barrier 6.

Coupling means on the rack member's upper and lower edges cooperate with like coupling means carried by the spacers at 3. The coupling means as shown embodied within sleeves 8 and 9 coterminous with wall component 5 of the rack member. The sleeves are slotted at 8A and 9A to permit inserted passage of webs 10A of circular ribs 10 on the spacer. Accordingly the spacer ends are adapted for sliding engagement with the sleeves of each rack member. Coupling sleeve 9 additionally serves as a support at 9B against which the container may be rested or brought into abutment with during removal of a container from the rack. With attention to FIG. 3, will be seen that placement of a user's fingertips on the upper portion of container C followed by sliding upward displacement of the container and subsequent rotation of the container to the extent the container lower edge is free of shelf 4 and above barrier 6 thereon to enable grasping of the container.

A rear wall surface 5A of the rack member is preferably tangential with sleeves 8 and 9 so that the latter sleeve and particularly support surface 9B thereon will protrude or project an adequate distance to enable tilting of container C per FIG. 3 with surface 9B serving as a fulcrum.

In FIG. 2, a lengthwise groove 11 in wall 5 of the rack member serves to facilitate manual breaking off of the lower portion of the rack member when it is the lowermost rack member of a storage rack. Such removal of said lower portion enhances the overall appearance of the storage rack. Further, for appearance sake the face 6A of barrier means 6 may be surfaces similar to the surface of a compact disc container to provide an attractive rack particularly when filled with compact disc containers.

The spacers 3 preferably serve to also attach the rack to wall 1 by means of fastener 12.

The present rack may be extruded resulting in economical manufacture of same. Further, rack configuration permits packaging of rack components in a partially nested manner to reduce packaging costs and reduce storage space requirements in retail outlets.

While we have shown but one embodiment of the invention, it will be apparent to those skilled in the art that the invention may be embodied still otherwise without departing from the spirit and scope of the invention.

Having thus described the invention, what is desired to be secured by a Letters Patent is:

We claim:

1. A rack for the storage of articles in rows along a room wall, said rack comprising, rack members for vertically spaced placement on the room wall and each including a wall and a shelf having article barrier means, spacers located between said rack members and adapted for room wall attachment, and coupling means on said spacers and said rack members for coupling of the rack members in a vertical spaced apart relationship to one another, said coupling means including a support surface for supporting of the articles in an upright position and enabling tilting of the article by fingertip pressure during article removal from the rack.

2. The rack claimed in claim 1 wherein said coupling means includes sleeves, said support surface on some of said sleeves.

3. The rack claimed in claim 2 wherein said sleeves define slots permitting sliding engagement with said spacers.

4. The rack claimed in claim 1 wherein said rack members each define a lengthwise extending groove in said wall to facilitate braking off of a portion of the rack member wall during installation on the room wall.

5. A rack for attachment to a room wall for the storage of articles, said rack including, rack members for vertically spaced apart attachment to the room wall and each including a wall component, a shelf and barrier means at the distal edge of the shelf, spacers for attachment to a room wall and to said rack members, coupling means on said rack members and said spacers to support the rack members in a spaced apart relationship, and a support surface offset from the wall component of said rack members and against which an article may rest, said support surface additionally supporting an article during tilting of the article during removal of the article from the rack, and said coupling means including sleeves on said rack members, said support surface on some of said sleeves.

6. The rack claimed in claim 5 wherein said spacers include ribs of circular section insertably engageable with said sleeves.

7. The rack claimed in claim 5 wherein said barrier means includes an upwardly extending portion and lower depending portion, said lower depending portion of greater vertical dimensions than said upwardly extending portion to confine the upper and lower extremities of an article at rest on a shelf while permitting manual upward displacement of the article during removal from the rack to the extent the lower extremity of the article is momentarily offset upwardly from said upwardly extending portion enabling outward passage of the article extremity for convenient removal of the article.

* * * * *